United States Patent Office 3,749,757
Patented July 31, 1973

3,749,757
SILOXANE MODIFIED POLYESTER FIBER CONTAINING ELASTOMER
Alfred Marzocchi, Cumberland, R.I., assignor to Owens-Corning Fiberglas Corporation
No Drawing. Continuation-in-part of application Ser. No. 32,431, Apr. 27, 1970, now Patent No. 3,674,724, dated July 4, 1972. This application Mar. 29, 1971, Ser. No. 129,209
Int. Cl. C08g 17/14, 39/10, 47/10
U.S. Cl. 260—824
4 Claims

ABSTRACT OF THE DISCLOSURE

This invention is addressed to improved polyesters which are particularly well suited for use as reinforcements for elastomeric material in the manufacture of polyester fiber-reinforced elastomeric products in which the polyester is formed of a polycarboxylic acid, a polyol and a polysiloxane which contains at least one functional group which is reactive to one of the acid or polyol monomeric components.

---

This is a continuation-in-part of copending application Ser. No. 32,431, filed Apr. 27, 1970, now U.S. Pat. No. 3,674,724, issued July 4, 1972.

This invention relates to improved polyester, and more particularly to improved polyesters for use as reinforcements in elastomeric products.

As used herein, the term "elastomer" is intended to mean and include natural rubber in the cured or uncured stage, vulcanized or unvulcanized stage, and synthetic organic elastomeric materials such as nitriles, acrylic and esters and terpolymers thereof with styrene and acrylonitriles; styrene and vinyl pyridine; and EPDM rubbers as represented by butadiene polymers and copolymers with monoolefins such as butadiene-styrene copolymer, butadiene-acrylonitrile copolymers, butadiene-styrene-vinyl pyridine terpolymers, chloroprene, isoprene, neoprene, isobutyl rubber and the like elastomeric polymers and copolymers in their cured or uncured stages, and vulcanized or unvulcanized stages. Included also are the EPDM rubbers, such as formed by the interpolymerization of ethylene, an alpha monoolefin having from 3–20 carbon atoms, such as propylene, and a polyene, such as dicyclopentadiene, 1–4 hexadiene and preferably an alkylene or alkylidene norbornene, such as 5-alkylidene-2-norbornene and the like in which the alkylidene group numbers from 2–12 carbon atoms, and polysulfone rubbers.

This invention is addressed to the fuller utilization of the desirable characteristics of polyester fibers, such as their excellent dimensional stability (i.e., low growth during service), and high resistance to thermal degradation when used in combinations with elastomeric materials as a reinforcement in belt manufacture, as a reinforcement in cords and fabrics to increase strength, life, wearability and service characteristics of rubber tires, and as a reinforcement and the like in other elastomeric coated fabrics and molded elastomeric coated fabrics and molded elastomeric products.

Polyester fibers have been used for some time as reinforcements and the like in elastomeric products such as tires. However, polyesters heretofore known have had the disadvantage that they suffer excessive losses of tensile strength under high load and high speed conditions where high temperatures are developed. In addition, there is a problem in establishing a strong bonded relationship between the polyester fibers and the elastomeric material whereby the polyester fibers have a tendency to tear away from the elastomeric material.

In copending application Ser. No. 32,431, filed Apr. 27, 1970, now U.S. Pat. No. 3,674,724 and entitled "Polyester Reinforced Elastomers," description is made of polyester compositions formed of conventional polycarboxylic acids and polyols, and an organo silane. As is described in the aforementioned copending application, it is believed that the silane reacts with the monomeric components to form a portion of the polymeric polyester matrix and thereby provide additional sites for cross-linking the polymeric material. Regardless of the theory, it has been found that organo silane-modified polyester fibers are characterized by improved tensile strengths, particularly under high speed and high load conditions during which high temperatures are developed, and by improved adhesion to elastomeric materials when used as reinforcements in polyester-fiber reinforced elastomeric products.

While the organo silane-modified polyester compositions described and claimed in the aforementioned copending application represent a significant advance in the art of polyester fibers for use as reinforcements for elastomeric materials, there is nevertheless room for further improvement in such polyester compositions, particularly from the standpoint of the modulus of polyester fibers produced therefrom.

It is accordingly an object of the present invention to produce and provide a method for producing a modified polyester for use in preparing polyester fibers having improved modulus.

It is a more specific object of the invention to produce and to provide a method for producing new and improved polyester fibers having improved modulus, and characterized by high tensile strength under high load and high speed conditions when used as reinforcement for polyester fiber-reinforced elastomeric.

The concepts of the present invention reside in a new and improved polyester composition for use as fiber-reinforced elastomeric products in the form of a polysiloxane-modified polyester formed by adding to the polyester at a time prior to the melt spinning of the polyester fiber a polysiloxane containing at least one functional group which is reactive with either the acid or polyol component of the polyester system whereby the polysiloxane becomes part of the polyester matrix. It has been found that polyester fibers prepared in accordance with the concepts of this invention are characterized by a significantly improved modulus. In addition, the polyester fibers of the present invention have increased tensile strengths at high temperatures, and provide a stronger bonded relationship when combined with elastomeric materials in the manufacture of polyester fiber-reinforced elastomeric products.

In the preparation of the novel polyesters of the present invention, use is made of conventional polycarboxylic acids and polyols of the types normally used in the preparation of polyesters. The acid monomer is generally an aliphatic or aromatic polycarboxylic acid having 2–25 carbon atoms and 2–4 carboxyl groups per molecule.

Particularly preferred acids are those having the formula:

wherein R is a divalent organic radical including alkylene having 1–10 carbon atoms, such as methylene, trimethylene, tetramethylene, etc.; alkenylene having 1–10 carbon atoms, such as ethenylene, propenylene, etc.; cycloalkylene having 4–10 carbon atoms, such as cyclopentylene, cyclohexylene, etc.; and arylene having 6–10 carbon atoms, such as phenylene, naphthylene, etc.

Representative of suitable acids are oxalic acid, malonic acid, succinic acid, glutaric acid, adipic acid, pimelic acid, suberic acid, azelaic acid; sebacic acid, dedecanedioic acid, undecanedioic acid, maleic acid, fumeric acid, glutaconic acid, 2-octenedioic acid, 1,3-cyclopentanedicarboxylic acid, 1,4 - cyclohexanedicarboxylic acid, phthalic acid, isophthalic acid, terephthalic acid, 1,3,5-benzenetricarboxylic acid, 1,8 - naphthalenedicarboxylic acid, 1,2,3,4 - cyclopentanetetracarboxylic acid, 1,2,3,4-benzenetetracarboxylic acid, 1,1,5 - pentanetricarboxylic acid, 1,2,4-hexanetricarboxylic acid as well as a variety of others.

It will be understood by those skilled in the art that anhydrides and acid halides, particularly the acid chlorides, derived from the foregoing acids may similarly be employed.

The polyols useful in accordance with the invention are aliphatic polyols containing 2–10 carbon atoms and 2–4 hydroxy groups per molecule. Illustrative polyols include ethylene glycol, propylene glycol, 1,4-butylene diol, hexamethylene glycol as well as a variety of others.

As the polysiloxane, use can be made of any of a number of polysiloxanes known to those skilled in the art. For example, use can be made of linear polysiloxane obtained by polymerization of a silane of the formula.

(II)

wherein R is hydrogen, alkyl containing 1 to 6 carbon atoms (e.g., methyl, ethyl, propyl, butyl, pentyl, etc.), cycloalkyl containing 5 to 10 carbon atoms (e.g., cyclopentyl, cyclohexyl, cyclohexylethyl, cyclopentylmethyl, etc.), alkenyl containing 2 to 6 carbon atoms (e.g., vinyl, allyl, etc.) and phenyl, as well as the hydroxy, epoxy, glycidoxy[3] and amino derivatives thereof, as represented by beta-hydroxyethyl, gamma-hydroxypropyl, delta-hydroxybutyl, 3,4 - epoxycyclohexyl, 2,3 - epoxycyclopentyl, beta - aminovinyl, gamma - aminoallyl, beta - aminoethyl, gamma-aminopropyl, delta-aminobutyl, p-aminophenyl, p-hydroxyphenyl, etc.; Z is a readily hydrolyzable group, such as halogen and preferably chlorine or bromine, or alkoxy containing 1 to 6 carbon atoms (e.g., methoxy, ethoxy, propoxy, etc.) and $R_1$ is alkyl containing 1 to 6 carbons (e.g., methyl, ethyl, isopropyl, etc.) or hydrogen.

As is well known to those skilled in the art, such polymers can be prepared by polymerizing the foregoing silanes with water, and can take the form of linear polymers containing repeating units of the formula

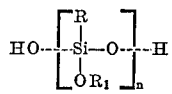

(III)

where $n$ is a function of the molecular weight. It is generally preferred in the practice of the invention to make use of such polymers which have a molecular weight generally less than 2500, and preferably within the range of 300 to 800.

Representative of the silanes which can be used in the preparation of the foregoing siloxanes include ethyl trimethoxy silane,
propyldichloromethoxy silane,
cyclohexyltriethoxy silane,
vinyltrimethoxy silane,
allyldibromoethoxy silane,
phenyltrimethoxy silane,
gamma-aminopropyltrimethoxy silane,
delta-aminobutyldichloroethoxy silane,
gamma-aminoallyltrimethoxy silane,
beta-hydroxyethyltrimethoxy silane,
gamma-hydroxypropyldichloromethoxy silane,
3,4-epoxycyclohexylethyltrimethoxy silane,
glycidoxy propyldichloromethoxy silane,
p-aminophenyltrimethoxy silane as well as a variety of others apparent to those skilled in the art.

Use can also be made of siloxanes derived from silanes of the formula

(IV)

wherein $R_2$ is a divalent organic radical, and preferably alkylene containing 1 to 6 carbon atoms (e.g., methylene, dimethylene, trimethylene, tetramethylene, etc.) alkenylene containing 2 to 6 carbon atoms (e.g., ethenylene, propenylene, butenylene, etc.), or cycloalkylene containing 5 to 10 carbon atoms (e.g. cyclopentylene, cyclohexylene, etc.) and R and Z are as set forth above. The siloxanes prepared from silanes of this type can similarly be linear polymers having the formula

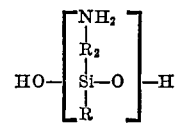

(V)

Representative silanes which can be used in preparing the foregoing polysiloxane include gamma-aminopropylethyldichloro silane,
beta-aminoethylvinyldimethoxy silane,
bis-(gamma-aminopropyl) dimethoxy silane,
bis-(delta-aminobutyl) dichloro silane,
beta-aminovinyldichloro silane,
beta-aminovinylallyldichloro silane,
gamma-aminoallylisopropyldimethoxy silane,
3-aminocyclohexylvinyldimethoxy silane,
3-aminocyclopentylethyldichloro silane,
bis-(gamma-aminoallyl) dimethoxy silane,
beta-aminoethyl-beta-hydroxyethyldichloro silane,
beta-aminoethyl-gamma-glycidoxypropyldimethoxy silane as well as a number of others.

However, the present invention is not limited to linear polysiloxanes formed by the polymerization of the silanes defined by (II) and (IV). For example, use can be made of the corresponding dimers of the formula

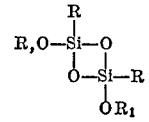

(VI)

or

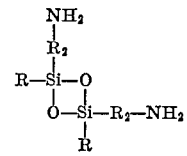

(VII)

as well as the corresponding trimers of the formula

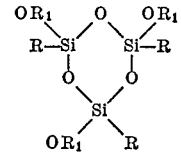

(VIII)

or

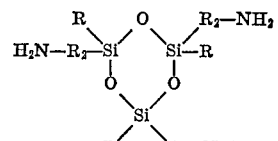

(IX)

Such dimeric and trimeric compounds can be prepared from the foregoing silanes in accordance with methods well-known to those skilled in the art, in which the amount of water employed is controlled to limit the degree of polymerization.

In accordance with another concept of the invention, use can be made of a polysiloxane in the form of a copolymer formed by polymerization of a silane having the formula

wherein $R_3$ and $R_4$ are each hydrocarbon groups or hydrogen containing 1 to 10 carbon atoms, and are preferably each selected from the group consisting of alkyl containing 1 to 6 carbon atoms (e.g., methyl, ethyl, propyl, etc.), cycloalkyl containing 5 to 10 carbon atoms (e.g., cyclohexyl, cyclopentyl, cyclohexylmethyl, cyclopentylethyl, etc.), phenyl or hydrogen with at least one other silane which provides at least one functional group which is reactive with either the acid or polyol monomer used in the preparation of the polyester.

For this purpose, use can be made of one or more of the silanes defined by (II) or (IV) above. Thus, these copolymers contain repeating units of the formula

and units of the formula

derived from the silanes (II). As will be appreciated by those skilled in the art, the $OR_1$ group is reactive with the polyester and/or the acid monomer by way of an ester interchange and/or an esterification mechanism. Where R is one of the hydrocarbon groups described above substituted by an amino group, a hydroxy group, a glycidoxy group or an epoxy group, the R group similarly provides a functional group which is reactive with the polyester or acid monomer.

Where use is made of the silanes (IV), the copolymers contain the repeating units (XI) and units of the formula

whereby the amino substituent attached to the R group provides a site which is reactive with carboxyl groups of the polyester system. In addition, where R is a substituted hydrocarbon group described above, the R group provides additional functional groups which are reactive with the polyester system as described.

In addition to the silanes (II) and (IV) as the co-monomeric components of the polysiloxane copolymer of this concept of the invention, use can also be made of tetra-alkoxy silanes $$Si(OR_1)_4 \quad (XIV)$$

where $R_1$ is $C_1$ to $C_6$ alkyl as described above which provide reactive units in the copolymer having the structure

Alternatively, use can also be made of carboxyl silanes of the type described in U.S. Pat. No. 3,169,884. These silanes have the formula

where $R_3$ is a divalent organic radical, and preferably an alkylene group containing 1 to 5 carbon atoms, $R_1$ and Z are as set forth above, and $R_4$ is hydrogen or lower alkyl (e.g., methyl, ethyl, propyl, etc.) and provide a copolymer containing units of the formula

As will be appreciated by those skilled in the art, the groups (XVII) are reactive through the carboxyl or carboxyalkyl groups with the polyol component of the polyester system through esterification or transesterification and through the $OR_1$ group as described above.

The amount of the silane containing at least one functional group which is reactive with the polyester system present in the copolymeric siloxane of this concept of the invention is not critical and can accordingly be varied within wide ranges. However, for reasons of economy, the amount of the silane containing at least one reactive functional group is generally less than 70% by weight, and preferably within the range of 1 to 50% by weight.

As indicated above, the polysiloxane employed in the practice of this invention can be added to the polyester system at any time prior to the melt spinning of the composition to a polyester fiber. Thus, the polysiloxane can be added to the monomer with which it is reactive, such as the polycarboxylic acid monomer when the polysiloxane contains any one or more of the $OR_1$, amino, epoxy or glycidoxy groups or the polyol monomer when the polysiloxane contains a carboxyl group. Alternatively, the polysiloxane can be added to a mixture of the acid and polyol monomers in a polymerized or unpolymerized state so long as addition of the polysiloxane is made prior to the melt spinning of the polyester system.

When the polysiloxane is added to the acid or polyol monomer prior to reaction of one with the other, it is frequently desirable to maintain the mixture of the acid and the polysiloxane at an elevated temperature, such as temperatures above 80° C., for a period up to 3 hours in order to insure complete reaction of the polysiloxane with the monomer prior to polymerization. Alternatively, it is also possible to simply admix the polysiloxane with one of the monomers and then immediately react the siloxane-containing mixture with the other monomer. The reaction between the acid and the polyol may be conveniently carried out in accordance with conventional procedures and apparatus. For example, it is possible to use as the apparatus a conventional melt blend apparatus operated at a temperature in excess of 150° C., and preferably in excess of 180° C., for a period of 1 to 30 hours. It will similarly be understood that conventional acidic or basic esterification or transesterification catalysts may be used, if desired.

The amount of the polysiloxane employed in the preparation of the polyester systems of this invention is not critical and can be varied within wide ranges. However, in light of the fact that the use of large quantities of polysiloxanes contributes significantly to the costs, it is frequently preferred to employ from 1 to 20% by weight of the polysiloxane based on the total weight of the composition. It has been found that the resulting polyester fibers are formed with relatively distinct phases of silicone chains which are believed to favorably influence the modulus of the final polyester fibers and aid in the integration of such fibers with elastomeric systems in the manufacture of polyester fiber reinforced elastomeric products.

Having described the basic concepts of the invention, reference is now made to the following examples which are provided by way of illustration, and not by way of limitation of the practice of the invention.

EXAMPLE 1

A hydroxyl-terminated linear polysiloxane polymer of gamma-aminopropyltrimethoxy silane having an average molecular weight of 549 (26 grams) is admixed with 170 g. of terephthalic acid, and the resulting mixture is maintained at a temperature of 100° C. for a period of about 30 minutes. Thereafter, the resulting partially reacted mixture is reacted with 60 g. of ethylene glycol for 12 hours in a melt polymerization apparatus at a temperature of 190° C.

The resulting polysiloxane-modified polyester is melt spun in a conventional manner to provide polyester fibers which are found to have improved modulus and adhesive characteristics when combined with elastomeric materials in the manufacture of polyester fiber reinforced elastomeric products.

EXAMPLE 2

The procedure described in Example 1 is repeated using maleic anhydride, which is reacted with a hydroxyl-terminated, linear polysiloxane polymer of glycidoxypropyltriethoxy silane having an average molecular weight of 734 for 20 minutes at 90° C.

The partially reacted mixture is then reacted with propylene glycol at 200° C. for a period of 15 hours, after which the resulting siloxane-modified polyester composition is melt spun in accordance with conventional procedures.

As will be appreciated by those skilled in the art, the polysiloxane can be pre-reacted with the propylene glycol whereby the glycidoxy group forms an ether linkage with the glycol and the resulting product reacted with maleic anhydride or terephthalic acid is described.

EXAMPLE 3

A polyester melt formed of fumaric acid and butylene glycol is blended with a hydroxyl-terminated polysiloxane prepared by polymerization of allylethoxydichloro silane and having an average molecular weight of 625 at a temperature of 210° C. for a period of 2 hours.

The resulting product is then melt spun in a conventional manner to provide siloxane-modified polyester fibers having good modulus properties, and containing 8% polysiloxane by weight.

EXAMPLE 4

The procedure described in Example 3 is repeated, using a linear, hydroxyl-terminated polysiloxane prepared by polymerization of delta-aminobutylallyldimethoxy silane and having an average molecular weight of 916. The blending is carried out for a period of 2.5 hours at 220° C., after which the resulting product is melt spun in a conventional manner.

EXAMPLE 5

The procedure of Example 3 is again repeated using a polyester melt formed of maleic acid and hexamethylene glycol and the trimer of gamma-aminopropyltrimethoxy silane which has the structure.

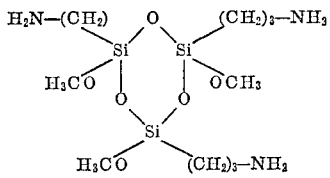

in an amount constituting about 13% by weight of the total blend. Blending is carried out at 210° C. for 3 hours, and thereafter the siloxane-modified polyester composition is melt spun.

EXAMPLE 6

In this example, a polyester melt formed of 1,4-cyclohexanedicarboxylic acid and diethylene glycol is blended with a linear, hydroxyl terminated polymer formed from 3,4-cyclohexylethyltriethoxy silane having an average molecular weight of 1027. After blending for 3 hours at 210° C. the resulting composition is melt spun to produce siloxane-modified polyester fibers.

EXAMPLE 7

In this example, a polyester melt formed of maleic acid and hexamethylene glycol is blended with a linear, hydroxyl terminated polysiloxane obtained by polymerization of delta-aminobutylhydroxyethyldimethoxy silane having an average molecular weight of 1328. Blending is continued for 3 hours at 230° C. after which the product is melt spun in a conventional manner.

EXAMPLE 8

In this example, use is made of a copolymer formed from 85% by weight dimethyldichloro silane and 15% by weight vinylmethoxydichloro silane having an average molecular weight of 839. A sample of 84 grams of this copolymer is admixed with 340 g. of terephthalic acid, and the resulting mixture is maintained at a temperature of 85° C. for 30 minutes. Thereafter, 132 g. of ethylene glycol are added, and the resulting composition reacted for 12 hours at 180° C. in accordance with the procedure described in Example 3.

The resulting modified polyester is melt spun in accordance with conventional procedures to provide polyester fibers having good modulus and good adhesion to elastomeric materials in the manufacture of polyester fiber reinforced elastomeric products.

EXAMPLE 9

The procedure described in Example 8 is repeated using a copolymer formed of 90% by weight divinyldichloro silane and 10% by weight of 3,4-epoxycyclohexylethyldichloro silane having an average molecular weight of 1230.

The siloxane copolymer is added to a polyester melt formed of maleic anhydride and propylene glycol, and the resulting mixture is blended for 2 hours at 190° C., after which the resulting composition is melt spun to form a polysiloxane-modified polyester.

EXAMPLE 10

The polysiloxane used in this example is a copolymer of 87% by weight dimethoxy silane and 13% by weight gamma-aminopropyltrimethoxy silane having an average molecular weight of about 536. The copolymer is admixed with terephthalic acid, and the resulting mixture is maintained at 100° C. for 30 minutes. Thereafter, butylene glycol is added, and the resulting compositon reacted for a period of 7 hours, after which the siloxane-modified polyester is melt spun in a conventional manner.

EXAMPLE 11

The procedure of Example 8 is repeated using a copolymer formed from 90% by weight diethyldichloro silane and 10% by weight gamma-aminopropylallyldimethoxy silane having an average molecular weight of 812, and a polyester melt of succinic acid and hexamethylene glycol.

The siloxane copolymer is blended with the polyester melt, and then the resulting siloxane modified polyester is melt spun in accordance with the procedure described.

EXAMPLE 12

The procedure of Example 8 is repeated using a polysiloxane copolymer formed from 95% by weight diphenyldichloro silane and 5% by weight of beta-carboxyethyltrimethoxy silane.

The polyester melt containing the copolymer is blended for 4 hours, after which the resulting composition is melt spun in a conventional manner.

EXAMPLE 13

In this example, a copolymer formed from 93% by weight dimethyldichloro silane and 7% by weight gamma-carboxypropyltrimethoxy silane having an average molecular weight of 493 is pre-reacted with butylene glycol for a period of about 40 minutes at 100° C. Thereafter, maleic acid is added to the product, and the resulting composition is reacted for 15 hours.

Thereafter, the product is melt spun in a conventional manner to provide siloxane-modified polyester fiber having improved modulus.

EXAMPLE 14

A polysiloxane copolymer formed of 70% by weight diallyldichloro silane and 30% by weight tetraethoxy silane having an average molecular weight of 733 is blended with a polyester melt formed from phthalic acid and propylene glycol at a temperature of 240° C. for 2 hours. The resulting composition is then melt spun in a conventional manner.

In fabricating the combination of the polyester fibers prepared in accordance with the concepts of the present invention with elastomeric materials, the polyester fibers are mixed with elastomeric material or otherwise laid down in the desired arrangement for combination with elastomeric material as in the manufacture of polyester fiber-reinforced belts or in the manufacture of rubber tires reinforced with cords of polyester fibers. The elastomeric material will thus constitute the continuous phase in which the polyester fibers are dispersed. The combination of polyester fiber and elastomeric material is pressed in a conventional manner by molding or cured under heat and compression for the advancement of the elastomeric material to a cured or vulcanized stage while in combination with the polyester fiber of the present invention whereby the polyester fibers become strongly integrated with the elastomeric material in the polyester fiber-elastomeric product.

It will be apparent that I have provided a new and improved polyester fiber for use in the manufacture of polyester fiber-reinforced elastomeric products. It will be understood that the polyester fiber prepared in accordance with the concepts of the present invention may be successfully adapted to a wide variety of other uses, such as the manufacture of polyester fiber-reinforced plastic products, for textiles and a wide variety of other uses.

It will be understood that various changes may be made in the details of formulation and methods of preparation and use without departing from the spirit of the invention, especially as defined in the following claims.

I claim:

1. In a polyester fiber-reinforced elastomer wherein an elastomeric material constitutes a continuous phase in which the polyester fibers are dispersed, the improvement comprising polyester fibers formed of a polyester prepared by the reaction of a polycarboxylic acid, a polyol and a siloxane polymer selected from the group consisting of (1) a homopolymer of a silane of the formula

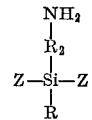

wherein $R_2$ is selected from the group consisting of alkylene, alkenylene and cycloalkylene, Z is a readily hydrolyzable group and R is selected from the group consisting of hydrogen, alkyl, cycloalkyl, alkenyl, phenyl and their hydroxy, epoxy, glycidoxy and amino derivatives, and (2) a copolymer of (a) a silane of the formula

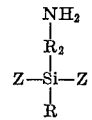

wherein $R_2$, R and Z are defined above, and (b) a silane selected from the group consisting of a silane of the formula

wherein Z is defined above and $R_3$ and $R_4$ are each selected from the group consisting of hydrogen and a hydrocarbon group and a silane of the formula $$Si(OR_1)_4$$

wherein $R_1$ is alkyl.

2. A polyester fiber-reinforced elastomer as defined in claim 1 wherein said polycarboxylic acid is an aliphatic or aromatic polycarboxylic acid having 2–25 carbon atoms and 2–4 carboxyl groups.

3. A polyester fiber-reinforced elastomer as defined in claim 1 wherein the siloxane is a hydroxyl-terminated linear polymer having an average molecular weight of less than 2500.

4. A polyester fiber-reinforced elastomer as defined in claim 1 wherein the siloxane is selected from the group consisting of the dimers and trimers of (1).

References Cited

UNITED STATES PATENTS

| | | | |
|---|---|---|---|
| 3,335,211 | 8/1967 | Mead et al. | 260—824 |
| 3,525,703 | 8/1970 | Iwami et al. | 260—5 |
| 3,542,900 | 11/1970 | Lammers | 260—824 |
| 3,193,516 | 7/1965 | Broatch et al. | 260—824 |
| 3,252,825 | 5/1966 | Marzocchi et al. | 260—827 |
| 2,686,739 | 8/1954 | Kohl | 260—824 |
| 2,721,854 | 10/1955 | Kohl | 260—827 |
| 2,768,149 | 10/1956 | Millar | 260—824 |
| 2,821,518 | 1/1958 | Edelman et al. | 260—824 |
| 3,015,637 | 1/1962 | Rauner et al. | 260—824 |
| 3,044,979 | 7/1962 | Saville | 260—824 |

JOHN C. BLEUTGE, Primary Examiner

W. J. BRIGGS, SR., Assistant Examiner

U.S. Cl. X.R.

260—3, 827, 873